UNITED STATES PATENT OFFICE.

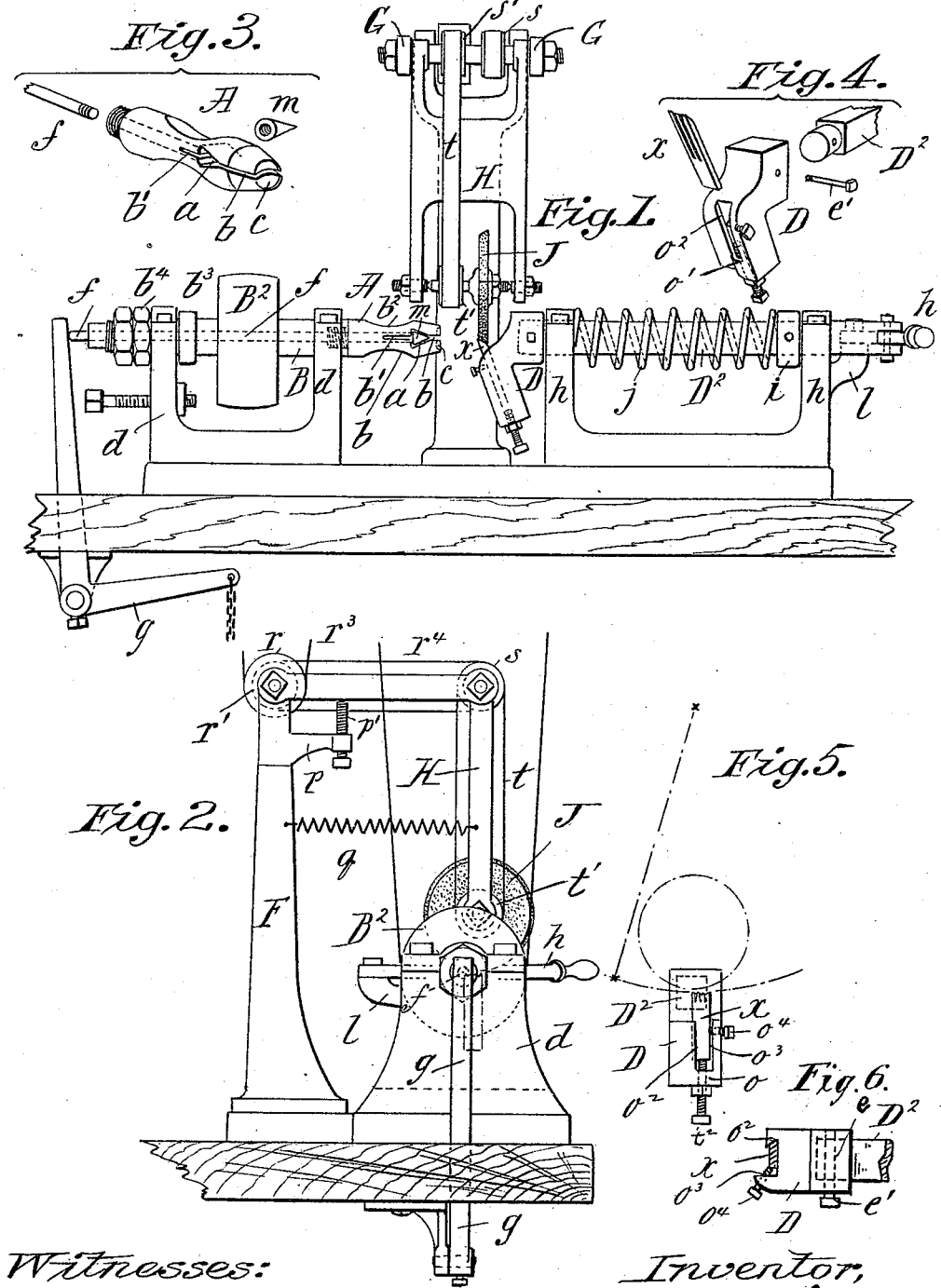

HOMER W. TERRY, OF SPRINGFIELD, MASSACHUSETTS.

MACHINE FOR CUTTING BUTTONS.

SPECIFICATION forming part of Letters Patent No. 492,997, dated March 7, 1893.

Application filed April 19, 1892. Serial No. 429,718. (No model.)

*To all whom it may concern:*

Be it known that I, HOMER W. TERRY, a citizen of the United States, residing at Springfield, in the county of Hampden and State of Massachusetts, have invented new and useful Improvements in Machines for Cutting Buttons, of which the following is a specification.

This invention relates to improvements in machines for turning small articles, such as buttons, which machines are especially adapted for turning pearl buttons, or those constructed of other unusually hard material.

The object of the invention is to so reorganize and improve the machine as to render it of unusual utility in various respects, as will be set forth or rendered apparent in and by the following description and explanations.

The invention consists in the constructions and combinations of parts all substantially as will hereinafter fully appear, and be set forth in the claims.

In the accompanying drawings a construction of machine embodying the present improvements is illustrated.

Figure 1 is a side elevation thereof. Fig. 2 is an end elevation. Fig. 3 is a view in perspective, showing the parts which constitute the chuck. Fig. 4 is a view in perspective showing the parts which constitute the tool-holder. Fig. 5 is an end face view of the tool-holder showing the tool, and indicating by dotted lines the relative dispositions of the grinding wheel. Fig. 6 is a plan view of the tool holder and tool.

In the drawings, A represents the chuck and D the tool holder. The chuck consists of a sufficiently stocky bar or body of steel having in its forward end the button receiving socket $c$. Just back of its socketed end, the chuck body has a laterally opening recess $a$ which is forwardly converging, being forwardly continued in the slot $b$ which extends to the forward end of the chuck-body, bisecting the said socket. Another slot $b'$ extends rearwardly in the chuck body from the said recess, and the body, at the sides which are in planes at right angles to the slot $b'$ are reduced as at $b^2$ to impart a suitable degree of spring capability to the chuck jaws. The chuck body is axially bored and is united to and in axial coincidence with a tubular shaft B, which is mounted for rotation in bearings of the standards, $d$ $d$. The tubular shaft has the collar $b^3$ which lies at one side of the bearing, and receives upon its screw threaded end, at the other side of the bearing, the nut or nuts $b^4$, all whereby the tubular shaft and chuck, which when the machine is set up for operation, is as one therewith, are prevented against longitudinal movements. The tubular shaft has the pulley $B^2$ by means of which through suitable belt it is rotated.

The spindle F is extended through the sleeve and chuck-body into the tapered recess $a$, receiving thereat the cone, $m$, or essentially, a wedge shaped piece. The endwise movement of the spindle and cone to spread the chuck jaws against the inherent spring reaction thereof, for the reception or discharge of the button, turned or to be turned, is insured by the operation of the elbow lever $g$. This operation may be by the chain connection with a foot lever (the latter not shown) or otherwise.

The tool holder D is carried by the endwise movable tool-holder-bar $D^2$ which is mounted for longitudinal reciprocatory movements in and through bearings, therefor, in the standards $h$ $h$. Rotation of the bar is prevented by reason of its square cross sectional shape and the conformation thereto of the bearings. The bar has the fixed collar $i$ against which one end of the spring $j$ bears, its other end being against the inner face of one of the said standards $h$.

The reciprocatory movement of the tool holder bar is insured in one direction against the spring by the connection therewith of the hand lever $h$ which has its pivoted support on the bracket $l$.

The tool holder D consists of a block, having a socket $e$ (for reception of the end of the tool-holder bar which is connected by the cross-pin $e'$) and the angular portion $n$ having in its face,—which is oblique to the common axial line of the chuck and tool holder bar,—the tool-receiving socket $o$. This socket has its upper end open, and at its other end, the wall $o'$, while the one side $o^2$ of the socket is under-cut or dovetailed, the other $o^3$ being at substantially a right angle to the face, as more clearly shown in Fig. 6. The screw $o^4$ passes through the wall which forms the right-angled boundary of the tool-socket, obliquely to said right-angled boundary, as seen in said Fig. 6, bearing on the corner of the tool, and serves to impart a pressure transversely on the tool to cause its beveled edge to be retained closely against the undercut border of the socket, and to also constitute an abutment against the forwardly outward displacement of the tool.

The upward, and forward edge of the tool,—regarded relative to the movements imparted to the carrier therefor,—is about coincident with a horizontal radial line from the axis of the button and is of a width to extend from the center of the button to or beyond the edge thereof, and has a conformation straight or curved to correspond with the required shape of the button to be cut.

Owing to the hardness of the medium worked upon by the tool, and the consequent necessity for frequent grinding of the tool without removal thereof from the holder, the provision of a grinding-wheel, as a co-operating part of the machine becomes a practical necessity, because the frequent grinding, under the conditions indicated must be performed by means always readily at hand. I have therefore devised improved means for the support and carrying of the grinding wheel whereby it may be brought to and removed from the edge of the tool, when the latter is, with its holder, retired from its operative position in proximity to the chucked button. Therefore at the rear of the tool-holder is the fixed standard F having pivoted thereto, at its top, the duplicated bar G which is horizontally extended, and which may be suitably transversely united or braced. Under the bar, the standard has the bracket arm $p$ with the vertically adjustable screw $p'$. whereby the bar may have its end, on which the pending grinding-wheel supporting-frame H is pivotally connected, maintained in any vertically adjusted position. The said frame is adapted for its swinging movement transversely to the length of the chuck and tool-holder-bar and is normally retained in a position of withdrawl from adjacent the tool by the spring $q$. The standard has at its top the pulley $r$ and pulley $r'$. and the duplicated bar has the pulleys $s$ and $s'$. The pulley $r$ receives its rotation through the belt $r^3$ and imparts it by belt $r^4$ to the pulley $s$ and also to the pulley $s'$. which is mounted to move as one therewith; and the connection by belt $t$ which the latter has with the pulley $t'$, on the axial support for the grinding-wheel J at the lower end of the frame, imparts the rotary motion to the latter wheel. After the tool has become dull and while it is still in its holder, the latter being in its withdrawn position, as insured by the spring $j$, the grinding-wheel frame may be by the hand drawn forward against the reaction of its retracting spring to working presentation upon the dulled tool-edge.

The tool may be set up, as the reduction thereof necessitates, by the screw $t^2$ which passes through the bottom wall $o'$. of the tool holder for its longitudinal forcing action relative to the tool.

Interchangeable chucks and tools may be provided as also modified forms of grinding wheels to accord with the different sizes and styles of the parts to be turned.

I claim—

1. A chuck consisting of a body having in its extremity a longitudinal slot which forms jaws at each side thereof, a forwardly tapering recess within the body intermediate of the length of and in communication with said slot, and said body also having the longitudinal passage through it leading to said recess, and a spindle longitudinally movable in said passage and having at its extremity, which is within said recess, an enlarged forwardly tapered member adapted for impingement on the inclined walls of said tapering recess and means for effecting the endwise movements of the spindle, substantially as and for the purposes set forth.

2. A chuck consisting of a body having the lateral recess $a$ intermediate of its length, and the longitudinally extended jaw forming slots $b'$ $b$ at the rear, and forward of the said recess, and the receiving depression in the end of the jaws, and the body having its thickness reduced at either side of the slot $b'$ for the purpose specified, and having the longitudinal passage, the spindle and the conical head therefor, substantially as described.

3. In a button cutting machine the combination with a chuck mounted for rotation in a fixed position, a tool, a holder, and bar mounted for sliding movements for presenting the tool into working proximity to the chuck, and retiring it therefrom, a support vertically over the retired position of the tool, a depending frame pivotally hung on said support, and having a grinding wheel journaled at its lower end, whereby the frame may have a swinging movement to carry the wheel horizontally and transversely of the line of movement of the tool to working contact therewith and retirement therefrom, substantially as described.

4. In a button cutting machine the combination with a tool and holder, the one mounted for movement horizontally toward and away from the other of a grinding wheel and a support on which the same is mounted which is vertically adjustable and also movable horizontally and transversely to the aforesaid horizontal line of movement of said working parts of the machine, substantially as and for the purpose set forth.

5. The combination with a tool holder of a standard F having bracket $p$ and vertically adjustable screw $p'$, of the bar pivotally mounted on and horizontally extended from an upper portion of the standard, the frame pivotally hung on said bar, and the grinding wheel rotatably mounted on the frame and means for securing its rotation, substantially as described.

6. The tool-holder having within its face a shallow channel or tool socket which has its one edge wall at right angles to the inner face of the socket and the other edge wall undercut, in combination with the tool one edge of which is beveled and the other right angled, and the retaining screw having its inner end at right angles to its axis, the screw being passed obliquely through the right angled edge wall to bearing on the adjacent corner of the tool whereby the tool is held against the undercut edge wall and also against outward displacement, essentially as shown.

HOMER W. TERRY.

Witnesses:
WM. S. BELLOWS,
H. A. CHAPIN.